United States Patent [19]
Goodman

[11] Patent Number: 5,822,299
[45] Date of Patent: Oct. 13, 1998

[54] PATH PROTECTION IN A TELECOMMUNICATIONS NETWORK

[75] Inventor: David Michael Goodman, St. Alban, United Kingdom

[73] Assignee: Nothern Telecom Limited, Montreal, Canada

[21] Appl. No.: 739,366

[22] Filed: Oct. 29, 1996

[51] Int. Cl.[6] ............................................. H04J 1/16
[52] U.S. Cl. ............................................. 370/228
[58] Field of Search .................................. 370/228, 247, 370/248, 252, 253, 389, 395, 216, 225, 251, 256, 527, 535, 537; 340/827, 825.01, 825.02, 825.03; 374/221; 395/181; 359/139, 115, 118, 135

[56] References Cited

U.S. PATENT DOCUMENTS

| | | | |
|---|---|---|---|
| 5,537,394 | 7/1996 | Abe et al. | 370/252 |
| 5,619,532 | 4/1997 | Tani et al. | 370/241 |

*Primary Examiner*—Dang Ton
*Attorney, Agent, or Firm*—John D. Crane

[57] ABSTRACT

Path protection is provided in a transmission equipment or node of a synchronous network in which traffic is carried in virtual containers within frames. Path protection is provided between first and second ingress points and an egress point by embedding an encoded measure of the respective path quality within a pointer associated with each frame. This measure temporarily replaces a set of pointer bits which are subsequently regenerated. At the egress point the quality measures of the two paths are compared and the higher quality path is selected.

5 Claims, 5 Drawing Sheets

PATH PROTECTION IN A TELECOMMUNICATIONS NETWORK

BACKGROUND OF THE INVENTION

This invention relates to telecommunications systems or networks, and in particular to an arrangement and method for providing path protection in such networks.

Telecommunication systems or networks employing synchronous, e.g. SDH or SONET transport techniques are usually provided with path redundancy or path protection of traffic transported across the network to signal processing equipment such as system nodes or cross connects. Path protection is a specific requirement of network operators to reduce the risk of outage and thus ensure an uninterrupted high quality service to customers. Conventionally, path protection is effected by the provision of two independent paths across the network for the traffic via respective ingress points to a single egress point of the processing equipment. One of these paths constitutes the main or normal transmission path, and the other provides a reserve or back-up path in the event of failure of the main path. Each of these paths is monitored to determine transmission quality and the equipment then chooses the better of these paths based on the transmission quality measurement. The results of these quality measurements are signalled across the equipment to the egress point where the path having the higher transmission quality is selected. This technique suffers from the disadvantage that the measurements are most efficiently be completed at the ingress points but the results of these measurements must then be transmitted to the egress point with sufficient rapidity for a decision to be made and a path selected. For example, the ITU/Bellcore standards specify a delay no greater than 50 ms between the quality measurement and the path selection point regardless of the number of faulty paths. With an increasing number of paths this can be difficult to achieve.

SUMMARY OF THE INVENTION

The object of the invention is to minimise or to overcome this disadvantage.

It is a further object of the invention to provide an improved method of path protection in a telecommunications network equipment or node.

It is a further object of the invention to provide an improved signal processing equipment for use in a synchronous network.

According to the invention there is provided a method of path protecting a transmission channel carried on first and second paths over a synchronous network to a signal processing station having ingress points one for each said path and an egress point for output of a processed signal, the method including adapting the channel at each said ingress to the local timing of the processing station, determining during said adaptation a measure of the transmission quality of each said path, embedding an encoded representation of the quality measurement within signals transmitted on the path to the egress point, determining at the egress point from the embedded encoded quality measure which of the first and second paths has the higher transmission quality, and selecting that path for output from the egress point.

According to another aspect of the invention there is provided a method of path protecting a transmission channel carried on first and second paths over a synchronous network to a signal processing station having ingress points one for each said path and an egress point for output of a processed signal, wherein traffic on the channel on the first and second paths is carried in virtual containers loaded into synchronous frames, each said container having respective pointer bits associated therewith whereby to identify the position of that virtual container within the frame, the method including locating the pointer bits each said ingress point, adapting the channel to the local timing of the processing station, determining at each said ingress point a measure of the transmission quality of each said path, generating new pointer bits corresponding to the local timing of the station, embedding an encoding of the measured transmission quality within the new pointer bits so as to provide an indication of that measure on the respective path overhead, transmitting the channels to the egress point, determining at the egress point from the embedded encoded quality measure which of the first and second paths has the higher transmission quality, and selecting that path for output from the egress point.

According to an further aspect of the invention there is provided a synchronous transmission equipment for use in a network in which transmission channels are carried each on first and second paths, the transmission equipment having ingress points one for each said path and an egress point for output of a processed signal, wherein the equipment has means for adapting the channel at each said ingress to the local timing of the processing station, means for determining during said adaptation a measure of the transmission quality of each said path, means for embedding an encoded representation of the quality measurement within signals transmitted on the path to the egress point, means for determining at the egress point from the embedded encoded quality measure which of the first and second paths has the higher transmission quality, and means for selecting that path for output from the egress point.

The technique provides a comparison of the quality of two or more paths at those points in the network where the paths come together by embedding the quality measure in spare capacity in each path. Decisions made on path quality can thus be made on comparisons between inputs which need not be on the same circuit card or even on the same equipment shelf.

Conveniently, the path quality information is carried on the path embedded in the signal by replacing the pointer 'ss' bits, which are used as an indication of what type of administrative unit (AU) and tributary unit (TU) the pointer is associated with, but are not further required within the station or node. At the egress from the station, i.e. at the point where the two paths come together, the replaced bits are decoded to determine which path has the higher quality, that path then being selected. When this selection has been effected, the ss pointer bits can then be regenerated before the signal is output from the egress of the station. Typically, the signal processing station comprises an SDH or SONET cross-connect or multiplexer/demultiplexer.

BRIEF DESCRIPTION OF THE DRAWINGS

An embodiment of the invention will now be described with reference to the accompanying drawings in which.

DETAILED DESCRIPTION OF PREFERRED EMBODIMENTS

Figure 1:
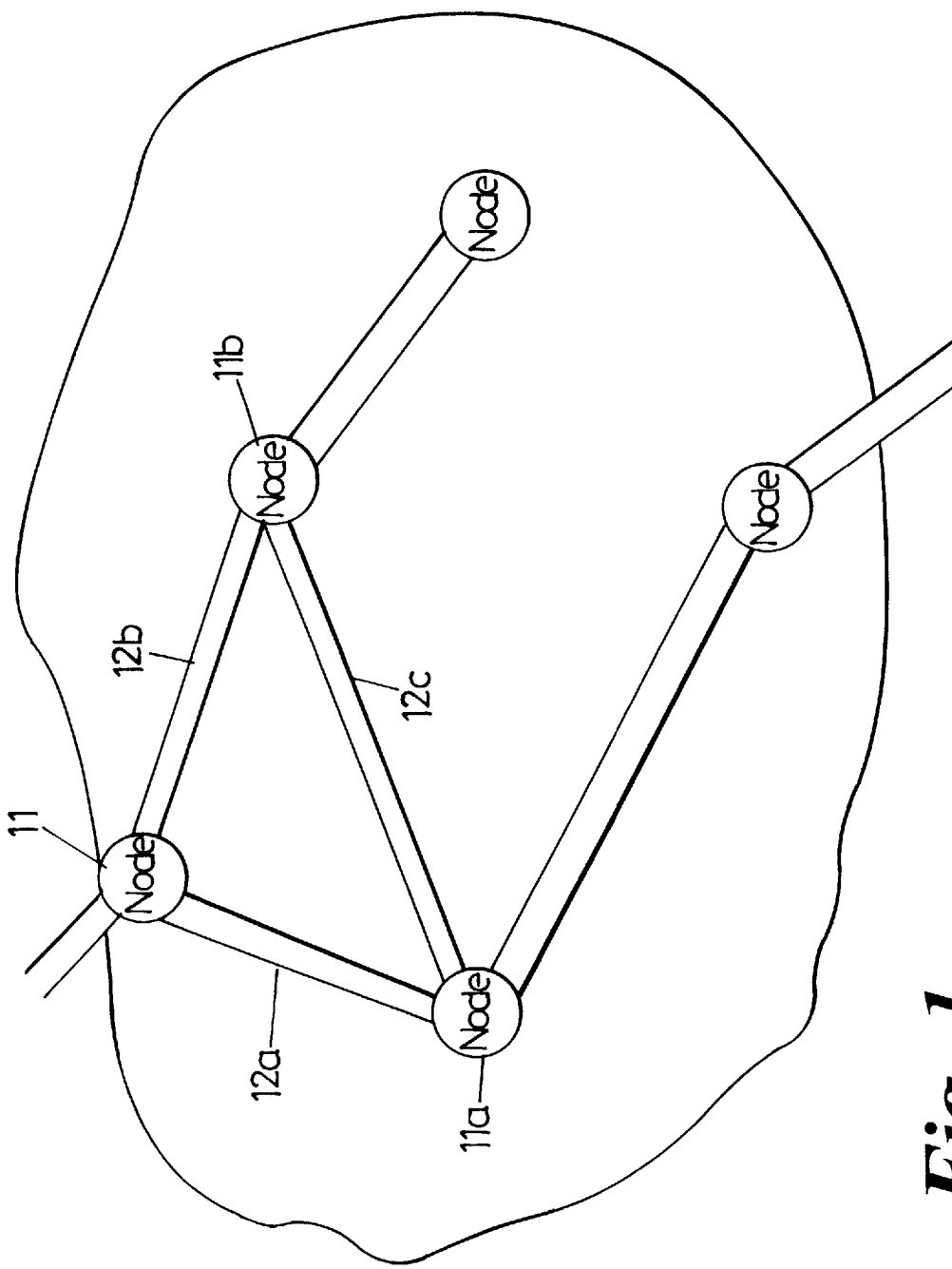
FIG. 1 is a schematic diagram of synchronous communications system or network.

Referring to FIG. 1, the synchronous network depicted schematically therein comprises a plurality of nodes generally indicated as 11 interconnected by transmission paths 12, typically comprising optical transmission paths. The nodes may comprise e.g. cross-connects and multiplexer/demultiplexers. Telecommunications traffic is carried over the network in virtual containers, each incorporating a payload and a path overhead used for supervisory and control purposes. These virtual containers are carried within frames, generally referred to as STM frames.

The synchronous network standards define different combinations of virtual containers which can be used to fill the payload area of an STM frame. The process of loading containers, and attaching overheads is repeated at several levels resulting in the "nesting" of smaller virtual containers within larger ones. This process is repeated until the largest size of virtual container (a VC-4 in Europe) is filled, and this is then loaded into the payload of the STM frame. When the payload area of the STM frame is full, some more control information bytes are added to the frame to form the "section overhead". The section overhead bytes are so-called because they remain with the payload for the transmission path between two synchronous multiplexers. Their purpose is to provide communication channels for functions such as OA&M (operations, administration and maintenance) facilities, user channels, protection switching, section performance, frame alignment and a number of other functions.

In a synchronous network, all equipment is synchronised to an overall network clock. It is important to note, however, that the delay associated with a transmission link may vary slightly with time. As a result, the location of virtual containers within an STM frame may not be fixed. These variations are accommodated by associating a pointer with each virtual container. The pointer indicates the position of the beginning of the virtual container in relation to the STM frame. It can be incremented or decremented as necessary to accommodate movements of the position of the virtual container within the frame.

An SDH or SONET transport signal contains a number of paths, where paths normally contain user data. The various standards support the transport of extra data in association with these paths (the path overhead), which permit equipment to measure the quality of the path. e.g.: is it the correct path, have any errors occurred to the path data, etc. The equipment can use these quality measures to perform functions such as protection switching, in which the equipment is presented with a choice of (usually) two paths which have arrived via different routes. The equipment then chooses the best path from one of the routes for local termination or forwarding to other equipment.

Path protection of transmitted traffic in the network of FIG. 1 is provided by setting up main and standby transmission paths between network nodes. Thus, for example, traffic between nodes 11a and 11b can be carried over the route comprising paths 12a and 12b or over the route comprising the path 12c. The signalling quality of the two transmission paths is monitored and, in the event that the quality of the main path falls below that of the reserve path, the reserve path is preferentially selected at the node 11b. This ensures that effective transmission is continued even in the event of complete failure of one or other of the two paths.

Figure 2:
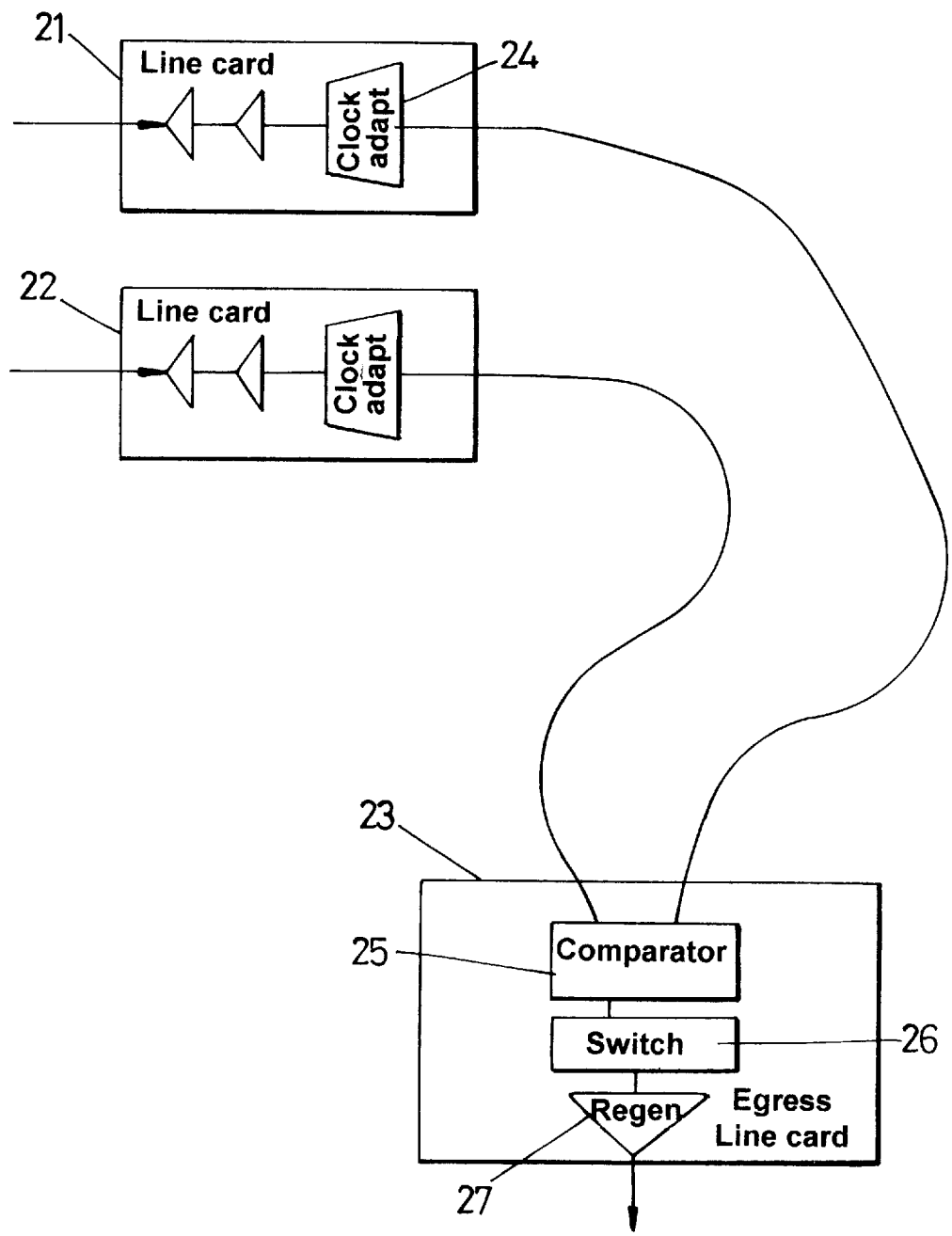
FIG. 2 illustrates an arrangement for path protection within a processing station of the network of FIG. 1.

Referring now to FIG. 2, this shows in schematic form the construction of a network node in the network of FIG. 1. The node incorporates first (21) and second (22) ingress line cards for receiving traffic carried across the network on the main and reserve paths respectively, and an egress line card 23 for outputting traffic from the node. For clarity, the internal signal processing equipment, e.g. multiplexing/demultiplexing equipment, disposed between the ingress and egress nodes is not described and only those portions of the node essential to the understanding of the invention are shown.

When a signal is received by a synchronous transport equipment, the signal is adapted to the timing of that equipment. This adaptation function (for example SDH G.783 Multiplex Section Adaptation and Higher Order Path Adaptation) usually known as 'pointer processing' is conveniently performed at equipment entry points which may be circuit cards or input shelves. The pointer processing gives rise to basic path quality measures in that total failures are identified which result in the path being declared AIS (the regenerated pointer is set to all 1's). We employ the same processing at this point to examine path overhead and determine other quality measures which include: correct Path Signal Label, Path Trace, Bit error rate and payload defect indicator.

At each ingress line card 21, 22, the incoming optical carrier is detected and demultiplexed to recover the transmission channel. The channel is then adapted via adaptation function 24 to the local clock of the node. The adaptation function involves location of the payload using the incoming pointer. This also provides a check for basic faults such as path A1S, or loss of the pointer. In addition, because the payload is being located, this is a convenient point at which to check the path overhead for performing a quality measurement.

The adaptation process uses the pointer to determine the position of the path overhead (POH) within the frame so as to recover the signal label, the path trace and the bit interleaved parity (BIP). The signal label and path trace are compared with predetermined values to identify potential errors. The BIP is compared with a value computed from a previous frame to identify parity errors. In this way a measure of the path quality is obtained, the fewer the errors the higher the quality of the path.

The adaptation function generates a new pointer corresponding to the local equipment timing and which points to the located payload. Because this pointer is generated locally, it is known to be either error-free or deliberately set "AIS", i.e. to all ONEs in response to gross incoming errors. Once adaptation has been achieved, the ss bits become redundant within the node and their position can thus be utilised to carry the path quality information over the path within the node to the point at which the main and reserve paths come together. The result of the path quality measurement is encoded on the path overhead in the position previously occupied by the ss bits of the pointer. This path quality information thus travels with the signal by being incorporated within the pointer. The signal quality of a path may thus be readily determined at various points within the node. If the signal has been found to fail at any such point, the path can be set 'AIS', i.e. the pointer bits are all set to ONE, so as to overwrite the incorporated quality value bits and give the correct signal fail indication.

At the egress line card 23 the path quality bits on the two paths are decoded and compared via comparator 25 which determines which of the paths displays the higher quality. That path is then selected by switch 26 controlled by the comparator 25. The path quality bits on that path are then overwritten with regenerated ss bits by circuit 27 before the signal is output from the node, the required values for the regenerated ss bits being known.

Figure 3:
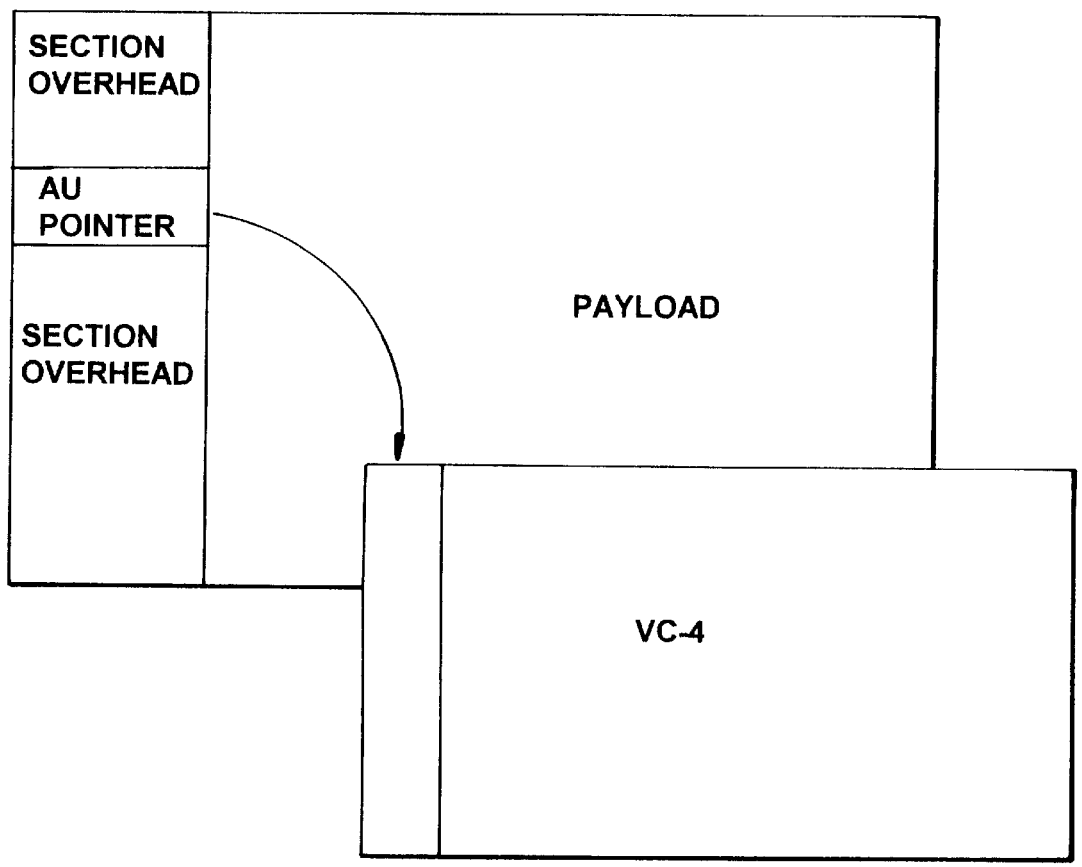
FIG. 3 is a schematic diagram illustrating a frame structure employed in the network of FIG. 1.

FIG. 3 illustrates a typical STM frame structure containing inter alia a VC-4 virtual container incorporating an AU-4 pointer to the path overhead (POH) of a VC4 virtual container. The pointer indicates the beginning of the virtual container within the frame. This virtual container may be unstructured or TUG (tributary unit group) structured The first byte of the pointer comprises a set of four NDF bits followed by two ss bits and two ID bits. In the event that these pointer bits are all set to ONE, this, as discussed above, indicates a path failure. Where the NDF bits are not all ONEs, this indicates that the path has not been disabled and the replaced values in the ss bit position provide an indication of the measured path quality as shown in Table 1 below.

TABLE 1

| NDF | SS | ID | PATH CONDITION |
|---|---|---|---|
| 1 1 1 1 | 1 1 | 1 1 | A I S |
| not all 1 | 1 1 | not all 1 | |
| not all 1 | 1 1 | not all 1 | Average |
| not all 1 | 0 1 | not all 1 | |
| not all 1 | 0 0 | not all 1 | Good |

Figure 4A:
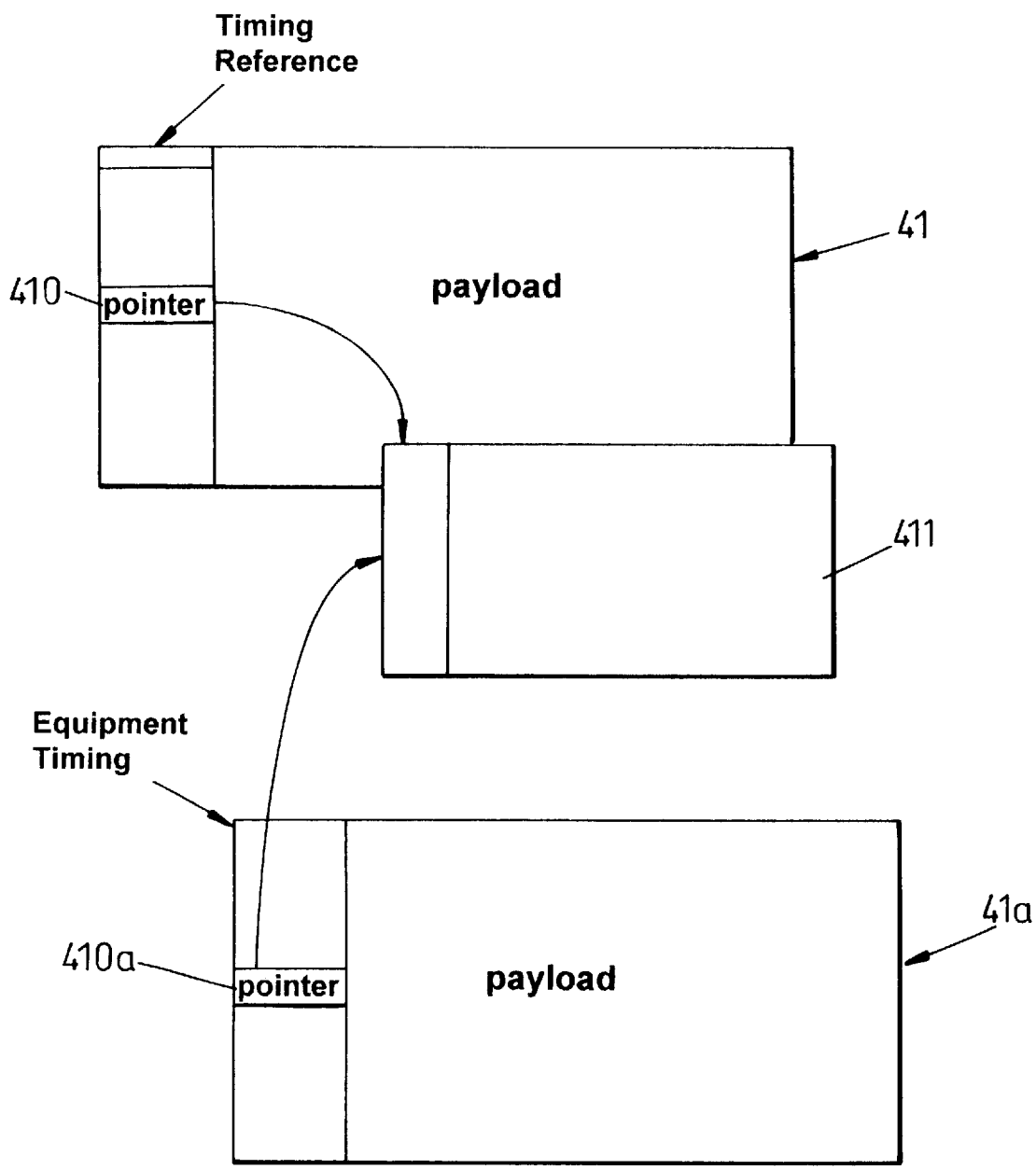
FIGS. 4a and 4b illustrate pointer processing or adaptation in the network of FIG. 1 and illustrate the frame structure before and after adaptation respectively.
Figure 4B:
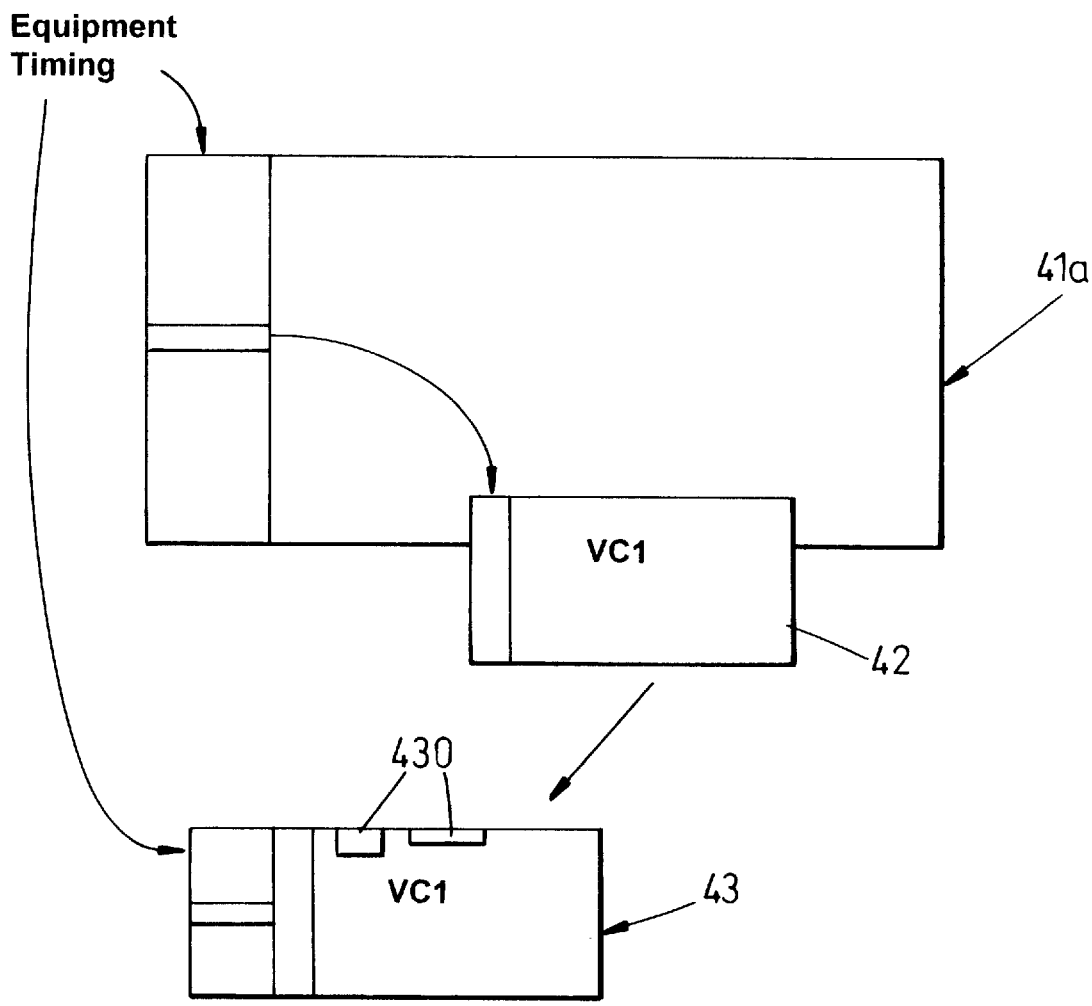

Referring now to FIGS. 4a and 4b, these illustrate the manner in which adaptation or pointer processing generates new pointers corresponding to the local equipment timing. Adaptation may be performed at one or two levels referred to as higher and lower order. FIG. 4a illustrates higher order adaptation and FIG. 4b illustrates lower order adaptation Referring first to FIG. 4a which illustrates the higher order or section adaptation process, an incoming frame 41 is first located in time using the framing pattern to find the start of the frame. This timing location of the frame defines the time position of the pointer which points to the payload. This payload can then be provided with a new path overhead based on the equipment timing so as to provide an adapted frame 41a. The new path overhead incorporates a regenerated pointer which points to the payload whose position has been precisely determined in the section adaptation process. It is this regenerated pointer that incorporates the encoded path quality information in the position normally reserved for the ss bits.

FIG. 4b illustrates lower order adaptation which is employed where lower order paths are being processed. The process is similar to the section adaptation process described above, but here the frame timing has already been determined and the path overhead of the higher order frame thus relates to the equipment timing. The lower order pointer in the path overhead of the adapted frame 41a is used to identify the position of the required virtual container 42, e.g. a VC1 container. This virtual container is extracted and is provided with suitable overhead information to generate a lower order frame 43.

It will be understood that although the path protection technique has been described above with particular reference to the SDH (synchronous digital hierarchy) protocol, it is in no way limited to use with that protocol but is of general application to synchronous transmission systems.

I claim:

1. A method of path protecting a transmission channel carried on first and second paths over a synchronous network to a signal processing station having a local timing and having ingress points one for each said path and an egress point for output of a processed signal, wherein traffic on a channel on the first and second paths is carried in virtual containers loaded into synchronous frames, each said container having respective pointer bits associated therewith in said frame so as to identify the position of that virtual container within that frame, the method including locating the respective pointer bits at each said ingress point, adapting the channel to the local timing of the signal processing station, determining at each said ingress point a measure of the transmission quality of each said path, generating new pointer bits corresponding to the local timing of the station, embedding an encoding of the measured transmission quality within the new pointer bits so as to provide an indication of that measure on the respective path overhead, transmitting the channels to the egress point, determining at the egress point from the embedded encoded quality measure which of the first and second paths has a higher transmission quality, and selecting that path for output from the egress point.

2. A method as claimed in claim 1, wherein the quality measure is embedded in the pointer by replacement of a set of pointer bits relating to an administrative unit and tributary unit with which the pointer is associated.

3. A method as claimed in claim 2, wherein the encoded quality measure is embedded by generation of a replacement pointer.

4. A method as claimed in claim 2, wherein said set of pointer bits are regenerated to their original values prior to output from the egress point.

5. A synchronous transmission network in which transmission channels are carried each on first and second paths over a synchronous network to a signal processing station having a local timing and having ingress points one for each said path and an egress point for output of a processed signal, wherein traffic on a channel on the first and second paths is carried in virtual containers loaded into synchronous frames, each said container having respective pointer bits associated therewith whereby to identify the position of that virtual container within said frame, wherein the signal processing equipment incorporates means for locating the pointer bits at each said ingress point, timing adaptation means for adapting the channel to the local timing of the signal processing station, means for determining at each said ingress point a measure of the transmission quality of each said path, means for generating new pointer bits corresponding to the local timing of the station, means for embedding an encoding of the measured transmission quality within the new pointer bits so as to provide an indication of that measure of the respective channel overhead, and means for determining at the egress point from the embedded encoded quality measure which of the first and second paths has a higher transmission quality and for selecting that path for output from the egress point.

* * * * *